(12) United States Patent
Martheenal

(10) Patent No.: US 8,291,760 B2
(45) Date of Patent: Oct. 23, 2012

(54) CONTAINER FOR RAIN

(75) Inventor: Basil Thompson Martheenal, Brampton (CA)

(73) Assignee: Orbis Canada Limited, Toronto, Ontario (CA)

(*) Notice: Subject to any disclaimer, the term of this patent is extended or adjusted under 35 U.S.C. 154(b) by 344 days.

(21) Appl. No.: 12/720,477

(22) Filed: Mar. 9, 2010
(Under 37 CFR 1.47)

(65) Prior Publication Data

US 2011/0084070 A1      Apr. 14, 2011

Related U.S. Application Data

(60) Provisional application No. 61/162,815, filed on Mar. 24, 2009.

(51) Int. Cl.
*G01W 1/00* (2006.01)
*G01W 1/14* (2006.01)

(52) U.S. Cl. ............... 73/170.17; 73/170.18; 73/170.21

(58) Field of Classification Search ... 73/170.16–170.21
See application file for complete search history.

(56) References Cited

U.S. PATENT DOCUMENTS

| | | | |
|---|---|---|---|
| 3,113,680 A | 12/1963 | Frater | |
| 3,347,394 A | 10/1967 | Gould | |
| 3,534,866 A | 10/1970 | Asenbauer | |
| 3,756,451 A | 9/1973 | Popeil | |
| 3,825,150 A | 7/1974 | Taylor | |
| 4,003,611 A | 1/1977 | Smith | |
| 4,027,774 A | 6/1977 | Cote | |
| 4,161,252 A | 7/1979 | Howells | |
| 4,205,749 A | 6/1980 | Carroll et al. | |
| 4,349,121 A | 9/1982 | Lafferty | |
| 4,753,367 A | 6/1988 | Miller et al. | |
| 4,867,339 A | 9/1989 | Hahn | |
| 4,867,340 A | 9/1989 | Byers | |
| 4,946,065 A | 8/1990 | Goulter et al. | |
| 5,071,008 A | 12/1991 | Hradisky | |
| 5,160,063 A | 11/1992 | Bailey | |
| 5,184,836 A | 2/1993 | Andrews, Jr. | |
| D347,095 S | 5/1994 | Apps et al. | |
| 5,377,858 A | 1/1995 | Morris, Sr. | |
| D355,741 S | 2/1995 | Craft et al. | |
| 5,413,003 A * | 5/1995 | Waite et al. | 73/170.18 |
| 5,445,397 A | 8/1995 | Evans | |
| 5,555,996 A | 9/1996 | Lang-Ree et al. | |
| 5,645,186 A | 7/1997 | Powers et al. | |
| D388,577 S | 12/1997 | Rehrig et al. | |
| D398,120 S | 9/1998 | Rehrig et al. | |
| 5,881,901 A | 3/1999 | Hampton | |

(Continued)

FOREIGN PATENT DOCUMENTS

CA          ID125054          4/2009

(Continued)

*Primary Examiner* — Andre Allen
(74) *Attorney, Agent, or Firm* — Ungaretti & Harris LLP

(57) ABSTRACT

A container system (10) for collecting and storing liquids comprises a receptacle (12) with an opening (11) at a top (13) thereof. The container system (10) further includes a lid (40) covering the opening (11) of the receptacle (12) and includes a central aperture (50) and a plurality of radial channels (60) in an upper and outer surface (41) spoking out from the aperture (50) to permit liquids impinging upon the outer surface (41) to flow through the channels (60) into the aperture (50). The lid (40) includes a screen (80) disposed and held within the aperture (50) with a plurality of interstices (82) therein.

20 Claims, 7 Drawing Sheets

U.S. PATENT DOCUMENTS

| | | | |
|---|---|---|---|
| 5,899,468 A | 5/1999 | Apps et al. | |
| D445,228 S | 7/2001 | Apps et al. | |
| 6,401,530 B1 * | 6/2002 | Roman | 73/170.21 |
| D491,328 S | 6/2004 | Aiken et al. | |
| 6,918,508 B2 | 7/2005 | Hwang | |
| D515,313 S | 2/2006 | Uffner et al. | |
| 7,017,773 B2 | 3/2006 | Gruber et al. | |
| 7,066,021 B1 * | 6/2006 | Noe | 73/170.17 |
| 7,114,631 B2 | 10/2006 | Aiken | |
| 7,121,564 B2 | 10/2006 | Hassell | |
| D532,173 S | 11/2006 | Aiken et al. | |
| D535,448 S | 1/2007 | Kilduff et al. | |
| 7,249,502 B2 * | 7/2007 | Luukkala et al. | 73/170.17 |
| 7,287,665 B2 | 10/2007 | Meissen et al. | |
| 7,401,508 B1 * | 7/2008 | Peterson | 73/170.17 |
| 7,536,907 B1 * | 5/2009 | Peterson | 73/170.22 |
| D624,723 S | 9/2010 | Raghunathan et al. | |
| 8,054,187 B2 * | 11/2011 | Dufaux et al. | 340/602 |
| 2006/0065657 A1 | 3/2006 | Wong | |
| 2006/0076260 A1 | 4/2006 | Luburic | |
| 2006/0191333 A1 * | 8/2006 | Noe | 73/170.17 |
| 2007/0062960 A1 | 3/2007 | Splain et al. | |
| 2008/0006638 A1 | 1/2008 | Yang et al. | |
| 2008/0223126 A1 * | 9/2008 | Geschwender | 73/170.17 |

FOREIGN PATENT DOCUMENTS

| | | |
|---|---|---|
| CA | ID126678 | 4/2009 |
| EP | 1760011 A2 | 3/2007 |
| GB | 2453055 A | 3/2009 |

\* cited by examiner

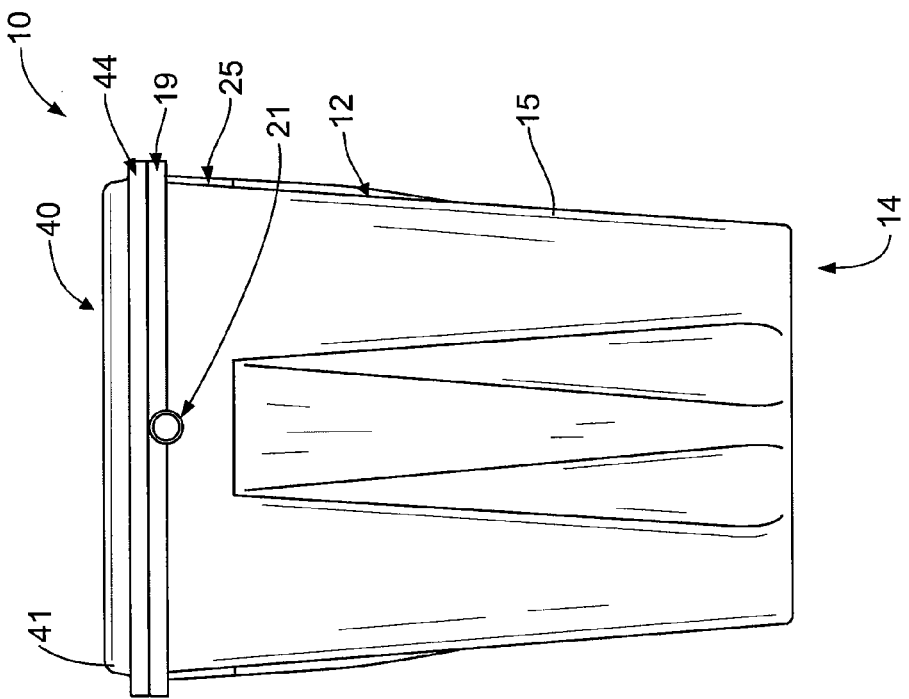
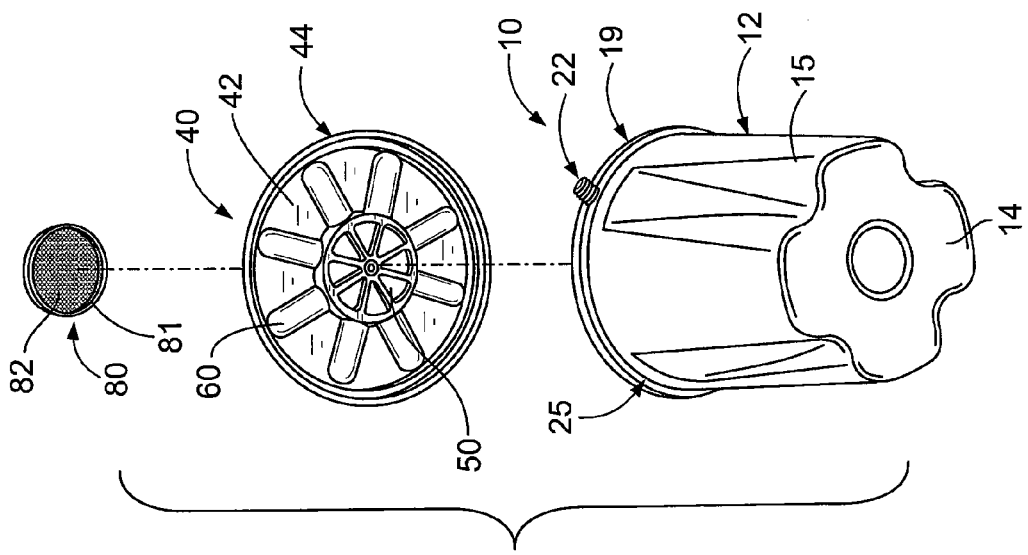

CONTAINER FOR RAIN

RELATED APPLICATIONS

The present invention claims the benefit of U.S. Provisional Application No. 61/162,815 filed Mar. 24, 2009, the contents of which are incorporated herein by reference.

TECHNICAL FIELD

The present invention relates to collection systems, and more particularly, to a container for collecting and storing rain.

BACKGROUND OF THE INVENTION

The watchwords today are protection, preservation and conservation. This is particularly true with respect to water. Preserving and conserving water has become especially important. One such way to preserve and conserve water is with rain barrels for catching and storing falling rain water. Rain barrels have been used for years to catch, store and use rain water. The uses of the captured rain are too numerous to mention. Some examples include watering vegetation, drinking, washing, and cooking. There is always a need to improve upon the many systems in existence today.

The present invention is directed to a container for rain and is an improvement upon existing rain barrels.

SUMMARY OF THE INVENTION

The present invention relates to a container for collecting and storing rain water and other liquids. The container comprises a receptacle with a central opening in the top, a lid covering the opening having a central aperture therein and a plurality of radial channels in an upper and outer surface spoking out from the aperture to permit liquids striking the upper, outer surface to flow through the channels into the aperture, and a screen disposed and held within the aperture.

In accordance with one embodiment, a container for collecting liquids, such as rain, comprises a receptacle for storing the liquid having an opening at a top of the receptacle and, a lid covering the opening of the receptacle. The lid has a central aperture and a plurality of channels in an upper and outer surface of the lid in fluid communication with the aperture. The plurality of channels spoke radially outwardly from the aperture. The container also includes a screen supported within the aperture. The screen can comprise a perimeter support holding a mesh with a plurality of interstices.

The container can further include at least one overflow spout in an upper portion of the receptacle. Additional spouts can be added.

The container can further include at least one drain in a lower portion of the receptacle. Again, more drains can be added.

The lid can have a pitch towards the aperture. Additionally, the receptacle can have an upper perimeter lip and the lid can have a perimeter lip. Preferably, the two lips frictionally engage one another.

In accordance with another embodiment, a container for collecting liquids comprises a receptacle for storing the liquid with an opening at a top thereof. The container includes a lid covering the opening of the receptacle. The lid includes a central aperture therein and a plurality of radial channels in an upper and outer surface spoking out from the aperture to permit liquids impinging upon the outer surface to flow through the channels into the aperture. The container further includes a screen disposed within the aperture with a plurality of interstices therein.

The receptacle and lid can be formed from an injection molded plastic. The screen can be metal.

Each channel can include a rounded end distal from the aperture. Additionally, each channel can include a ledge proximate the aperture.

The container can further comprise structure for supporting the screen in the aperture. The supporting structure can include an outer ring along a periphery of the aperture and a plurality of spokes projecting outwardly from a centrally located hub. The outer ring can be supported below the ledge by a generally cylindrical wall. A plurality of tangs can project outwardly from an inner surface of the wall to hold the screen. The screen can be circular and include a perimeter support.

The receptacle can include one or more drains proximate the bottom of the receptacle. Each of the drains can be threaded to receive a removable cap. Similarly, the receptacle can include one or more overflow spouts proximate the top of the receptacle. Again, the overflow spouts can be threaded to receive a removable cap.

Other features and advantages of the invention will be apparent from the following specification taken in conjunction with the following Figures.

BRIEF DESCRIPTION OF THE DRAWINGS

In the accompanying drawings forming part of the specification, and in which like numerals are employed to designate like parts throughout the same.

FIG. 3 is another perspective view of the container system of FIG. 1;

FIG. 4 is a left side elevation view of the container system.

DETAILED DESCRIPTION OF THE INVENTION

Figure 2:
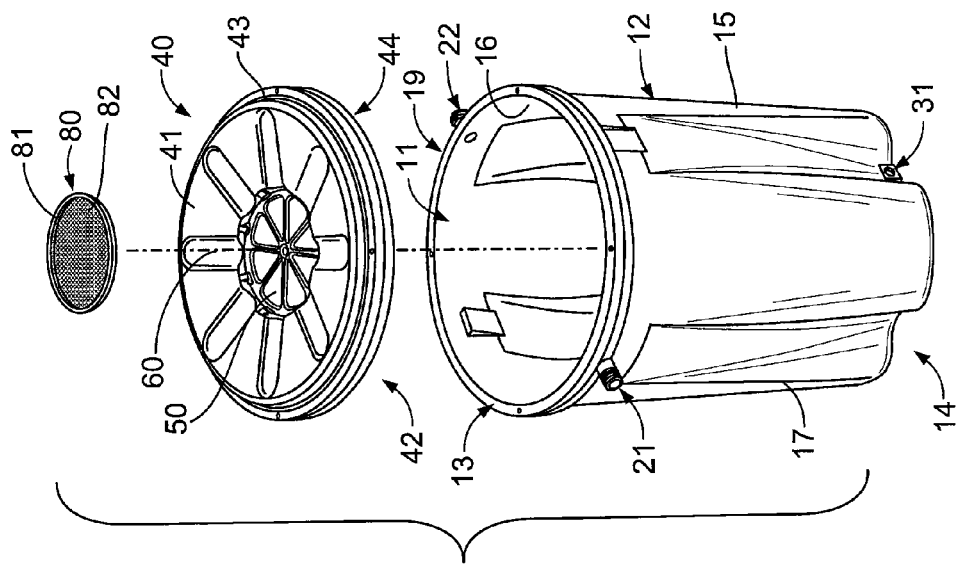
FIG. 2 is an exploded perspective view of the container system of FIG. 1.

While this invention is susceptible of embodiments in many different forms, there is shown in the drawings and will herein be described in detail, preferred embodiments of the invention with the understanding the present disclosure is to be considered as an exemplification of the principles of the invention and is not intended to limit the broad aspect of the invention to the embodiments illustrated. The present invention will have the following main components and techniques for operation of the system.

Figure 1:
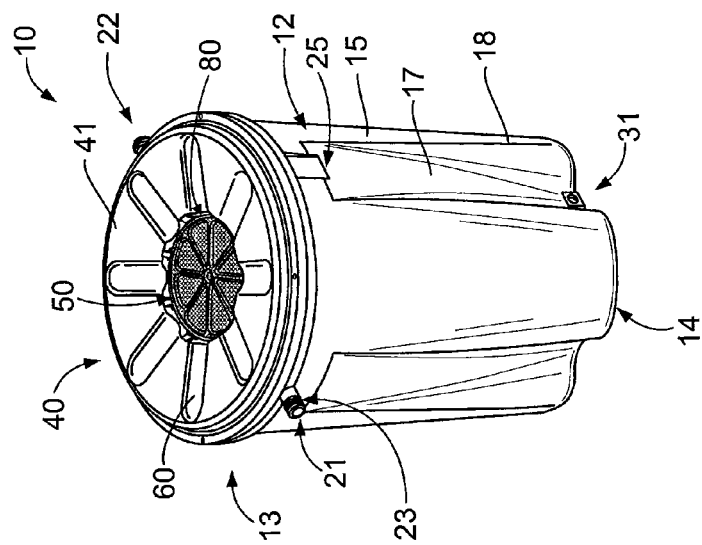
FIG. 1 is a perspective front view of the container system made in accordance with the teaching of the present invention.
Figure 6:
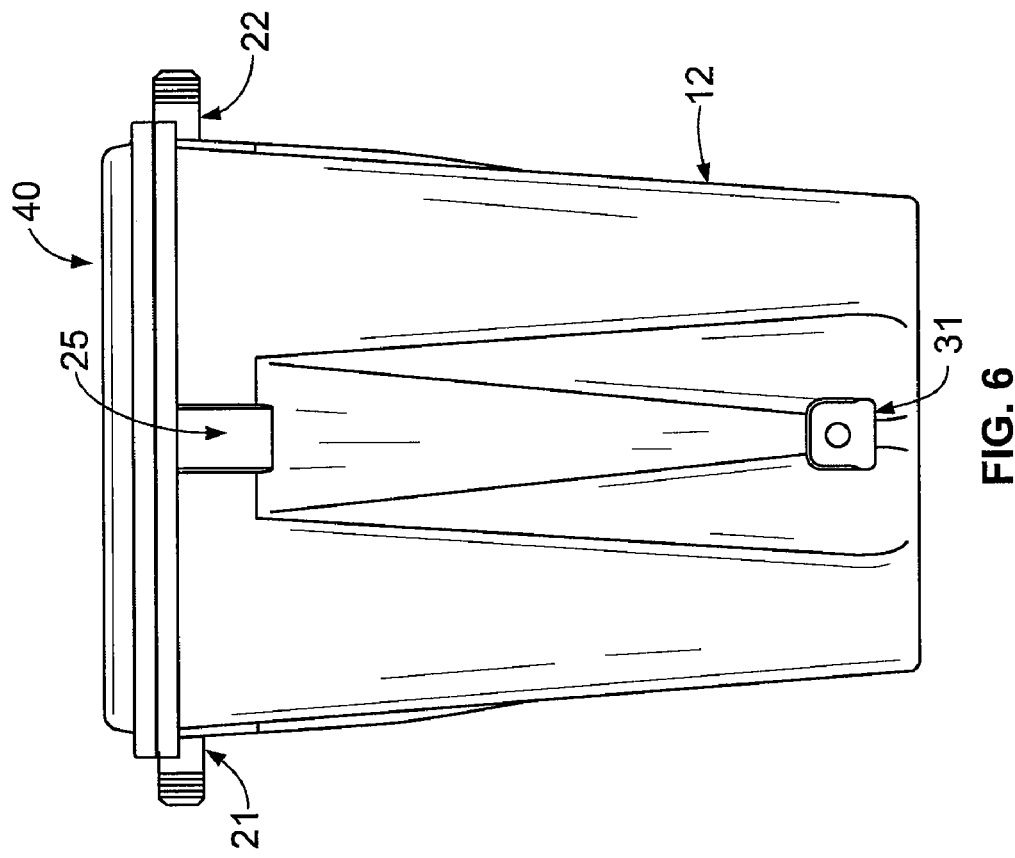
FIG. 6 is a front elevation view of the container system.
Figure 5:
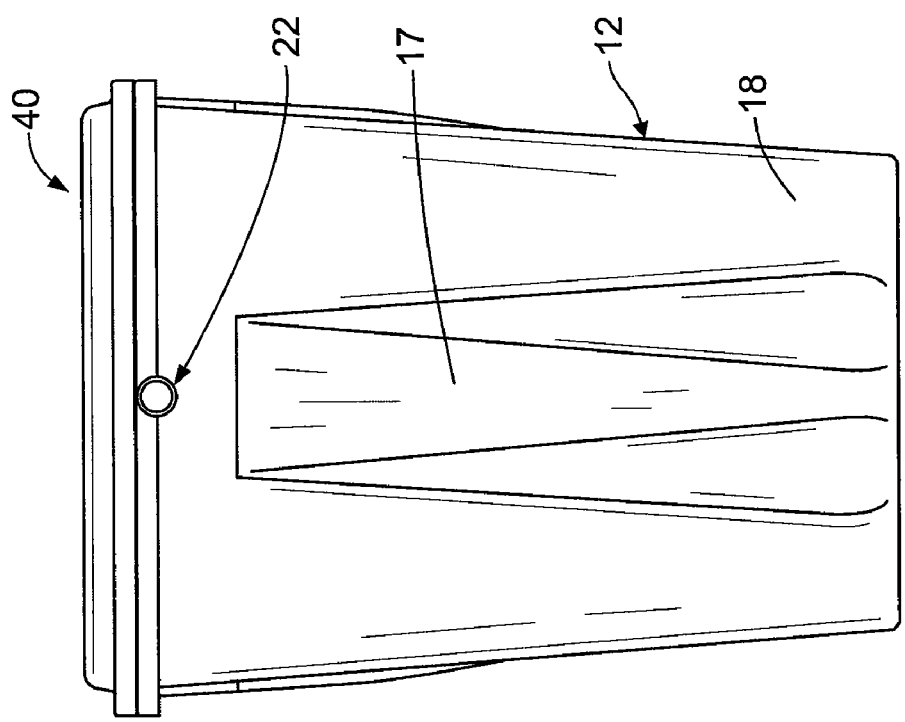
FIG. 5 is a right side elevation view of the container system.
Figure 7:
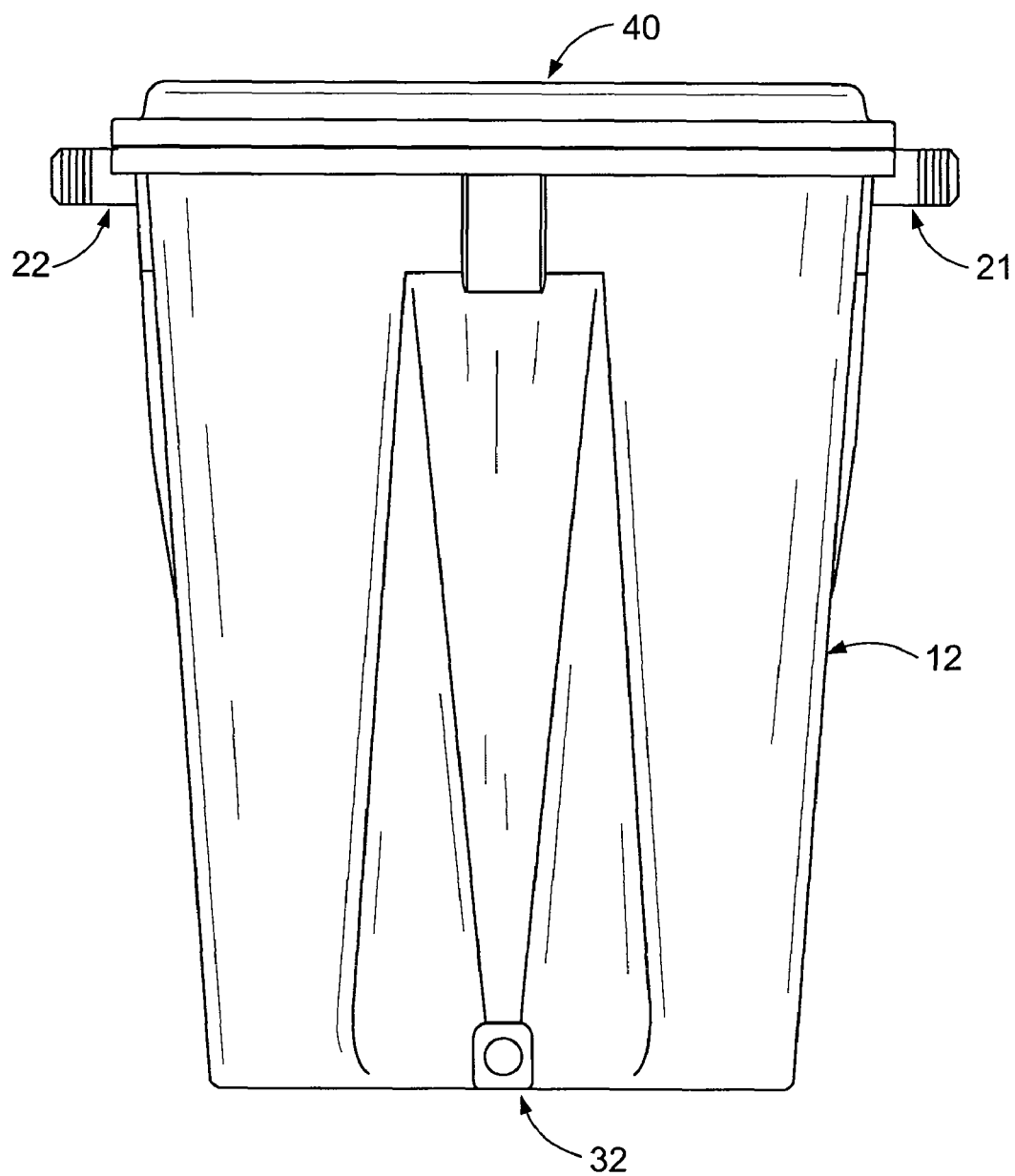
FIG. 7 is a rear elevation view of the container system.
Figure 8:
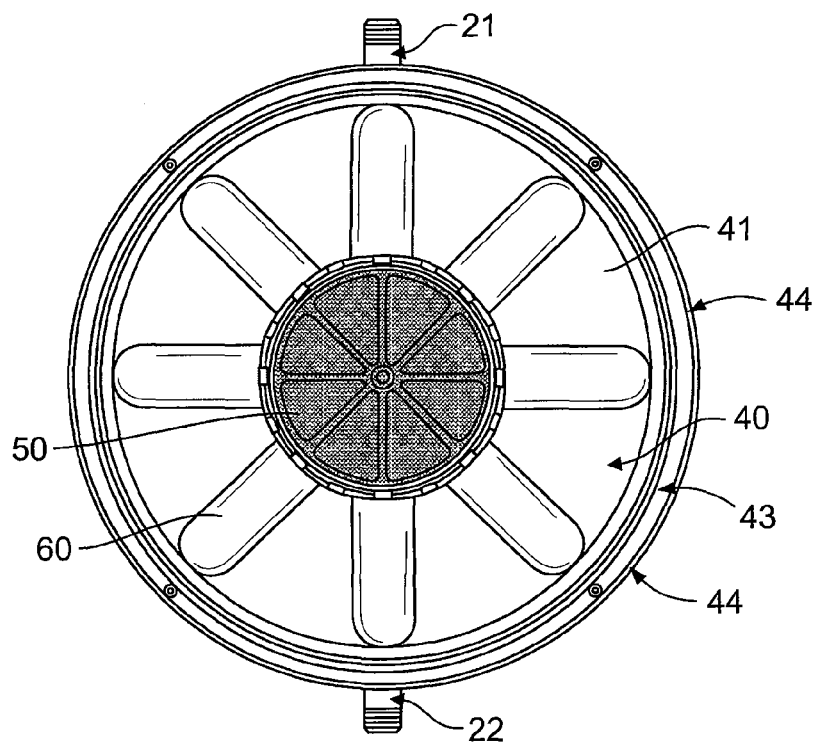
FIG. 8 is a top plan view of the container system.
Figure 9:
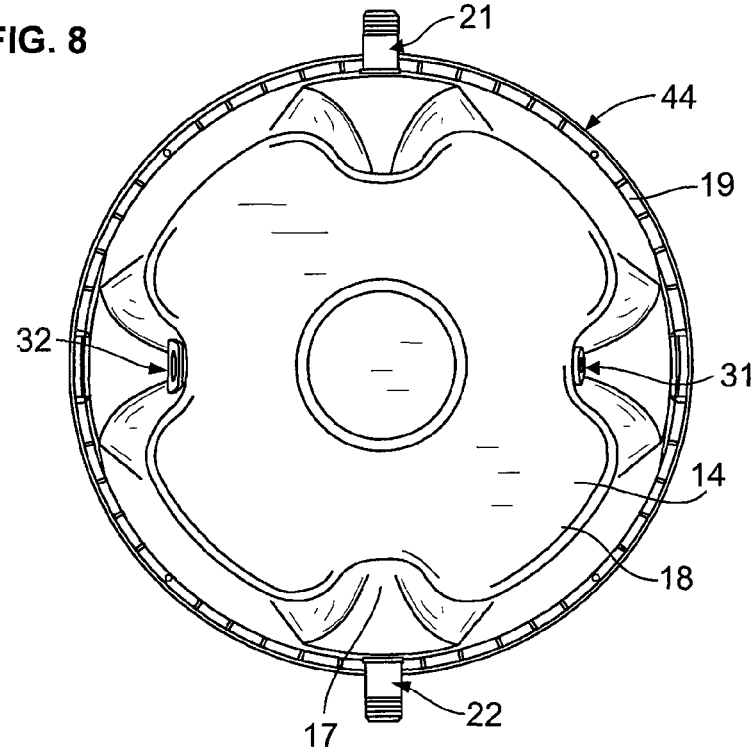
FIG. 9 is a bottom plan view of the container system.

The container system of the present system is shown generally in FIG. 1 by reference number 10. The system 10 includes three (3) primary components, that being the receptacle 12, the lid 40, and the screen or filter 80. The lid 40 captures impinging or striking rain and directs it into a central aperture 50. Once at the aperture, the rain passes through the filter 80 and into the receptacle 12 wherein it can be easily drained. To prevent overflow within the receptacle 12, a plurality of overflow spouts 21,22 are also provided near the top 13 of the receptacle 12. One or more drains 31,32 are provided near the bottom 14 of the receptacle 12 to drain the receptacle 12.

The Receptacle 12

The receptacle 12 of the container system 10 includes a top portion 13 with an opening 11. The receptacle 12 also includes a closed bottom 14, an inner surface 16 and an outer surface 15. The receptacle 12 is designed to hold water and, in particular, rain water. The receptacle 12 is made in a high pressure injection molding process using rigid injection moldable grade plastic. The receptacle 12 can be bumped and deformed slightly, but maintains its structural integrity. For additional structural strength, a reinforcement lip 19 is formed in the top 13 of the receptacle 12 adjacent the opening 11. Opposed indents 25 are formed below the lip 19 to serve as a place to put one's fingers when lifting and moving the receptacle 12. Though not shown, opposed handles can be formed in the outer surface 15 of the receptacle 12 for the same purpose.

A first drain 31 and a second drain 32 are positioned just above the bottom 14 of the receptacle 12 at slightly different elevations. These drains 31,32 pass through openings (not shown) in the inner and outer surfaces 16,15 of the receptacle 12 to permit water to flow from inside the receptacle 12 to out of the receptacle 12. The drains 31,32 preferably extend slightly outwardly from the outer surface 15 of the receptacle 12 and have external threading (not shown) at the distal end thereof. An internally threaded cap (not shown) may be threaded over each of the drain's 31,32 distal ends to ensure water does not inadvertently flow out therefrom. When desired, one may remove one or both caps from the drains to permit water to flow out of the receptacle 12 to empty it. If further desired, one may hook up a hose, such as a garden hose, by threading it to the distal end of one of the drains 31,32 so as to direct the flow of the water to a specific location, such as a garden, an outdoor drain, or a sump system.

A first overflow spout 21 and a second overflow spout 22 are positioned just below the upper lip 19. These spouts 21,22 pass through openings (not shown) in the inner and outer surfaces 16,15 of the receptacle 12 to permit water to flow from inside the receptacle 12 to out of the receptacle 12. These spouts 21,22 preferably extend outwardly from the outer surface 15 of the receptacle 12 and have external threading 23 at the distal end thereof. An internally threaded cap (not shown) may be threaded over each of the spout's 21,22 distal ends to ensure water does not flow out therefrom. When desired, one may remove one or both caps from the spouts to permit water to flow thereout to prevent the receptacle 12 from overflowing. If further desired, one may hook up a hose, such as a garden hose, by threading it to the distal end of the spout(s) 21,22 so as to direct the flow of the water to a specific location, such as a garden, an outdoor drain, or a sump system.

To reduce the weight of the receptacle 12 and to facilitate the flow of water within the receptacle to the drains 31,32, a plurality of longitudinal troughs 17, creating legs or feet 18, are formed into the receptacle 12. The troughs 17 are triangularly shaped or tapered towards the drains 31,32. This construction tends to prevent pooling within the receptacle.

The ring on the bottom 14 is to reinforce the bottom wall, to avoid warpage at the bottom and to protect the date and all other marks in or on the bin.

The Lid 40

The lid 40 has an upper, outer top surface 41 and an inner bottom surface 42 with a central aperture 50 in about the middle thereof. The aperture 50 permits the drainage of rain water striking the outer top surface 41 to pass through the lid 40 into the receptacle 12. A marginal edge 45 is formed at the perimeter of the lid 40 with a downwardly extending lip 44 formed at the outer edge thereof. The lip 44 in the perimeter of the lid 40 frictionally engages the upper lip 19 of the receptacle 12 so that the upper edge of the receptacle 12 is seated against the marginal edge 45. A plurality of radial channels 60 project outwardly from the aperture 50 (or inwardly from the perimeter lip 44) in the upper surface 41 of the lid 40.

Figure 10:
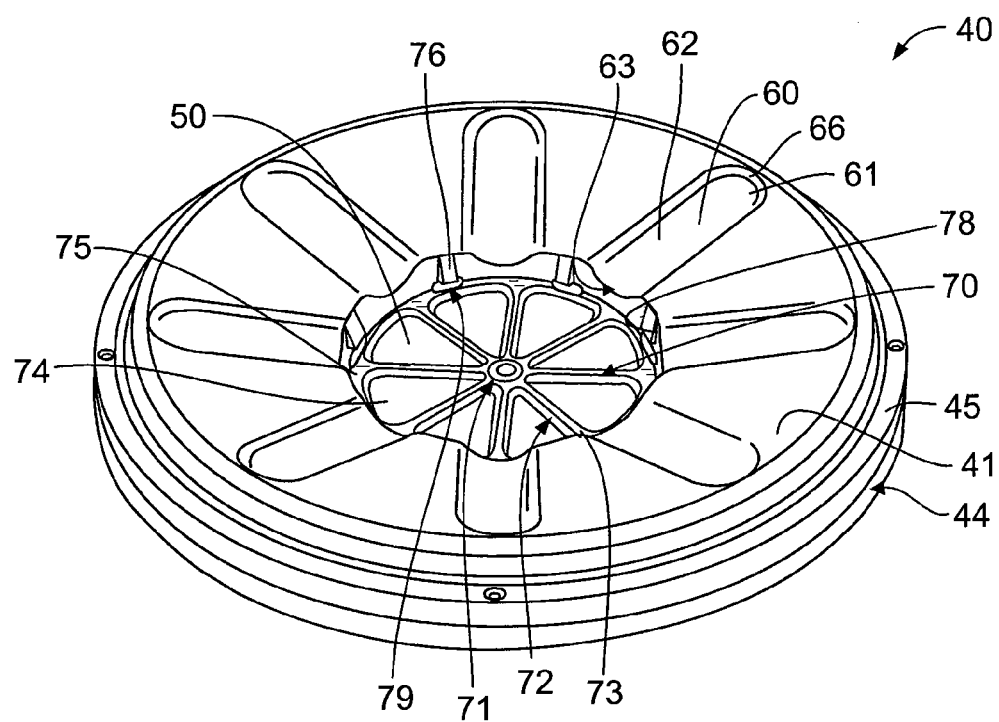
FIG. 10 is a top perspective view of the lid.

As shown in FIG. 10, each radial channel 60 has a rounded section 61, a consistent section 62, and a ledge 63. The rounded section 61 has a rounded wall 69 at or near the marginal edge 45 adjacent the perimeter of the lid 40. Rain water flows in the channel 60 from the perimeter towards the aperture and off the ledge 63. For this reason the channels 60 and/or the outer top surface 41 of the lid 40 are pitched downwardly towards the aperture 50. Accordingly, water striking or impinging the top or outer surface 41 of the lid 40 flows into the aperture 50.

Referring again to FIG. 10, a supporting structure or ring 70 is molded or attached to the lid 40 for supporting the screen or filter 80. The structure/ring 70 includes a centrally located hub 71 and a plurality of spokes 72 projecting radially outwardly therefrom to an outer ring 75. Voids 74 are created between the spokes 72 for water to flow therethrough. Each spoke 72 has fillets so as to create a reinforced foot 73 attaching to the outer ring 75.

Figure 11:
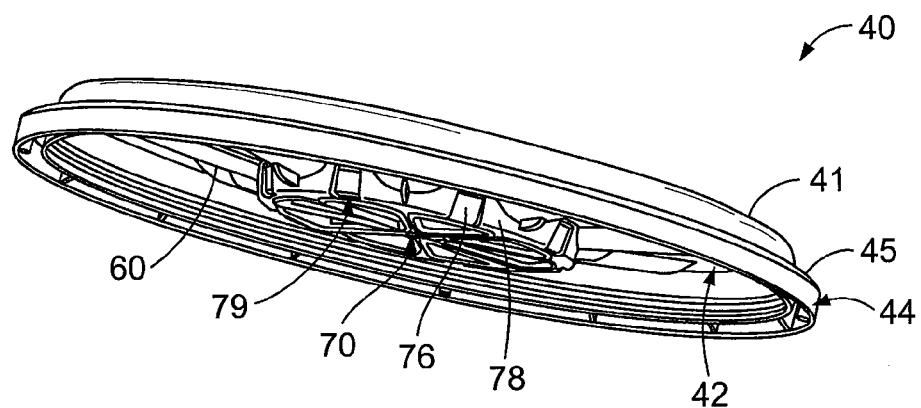
FIG. 11 is a side perspective view of the lid.
Figure 12:
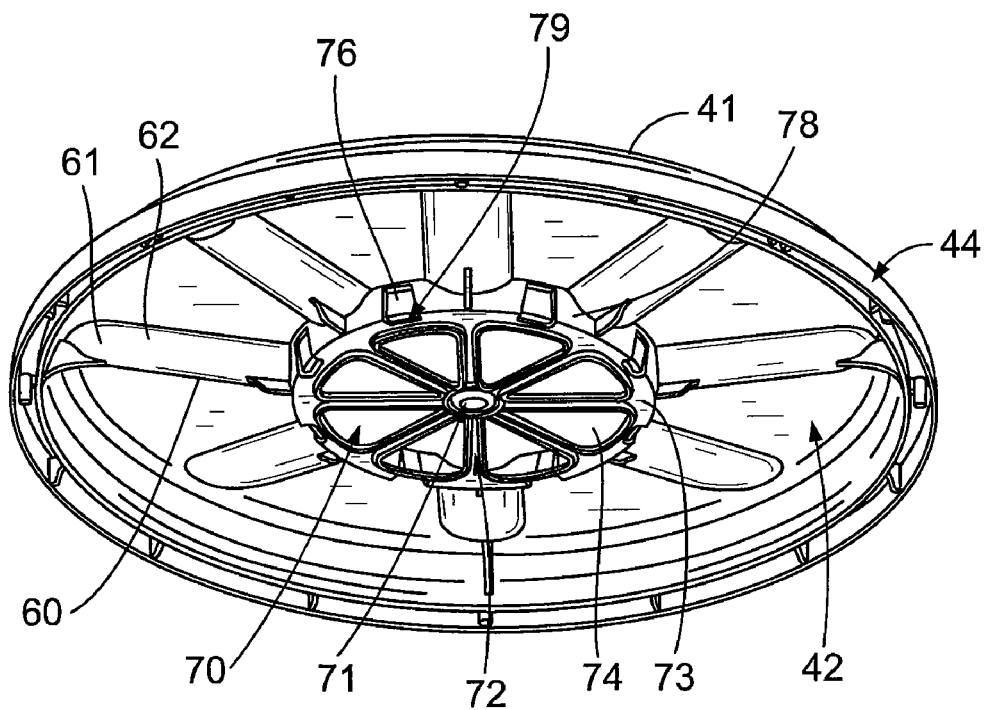
FIG. 12 is a bottom perspective view of the lid; and,
FIG. 13 is a bottom perspective view of the screen.

The outer ring 75 is supported below the ledge 63 by a wall 78. As shown in FIGS. 11 and 12, a plurality of tangs 76 are formed within the wall 78. Each tang 76 is connected or extends from the ledge 63 (annularly between the channels 60) to a slot 79 formed in the outer ring 75. As a result, the ring 70 is suspended below the ledge 63 and a circular screen can be held within the wall 78 on the ring 70 by the tangs 76.

The Screen 80

The screen 80 is supported on the ring 70 and below the ledge 63 by the tangs 76. As a result, water can flow over the ledge 63 and through the screen 80.

Figure 13:
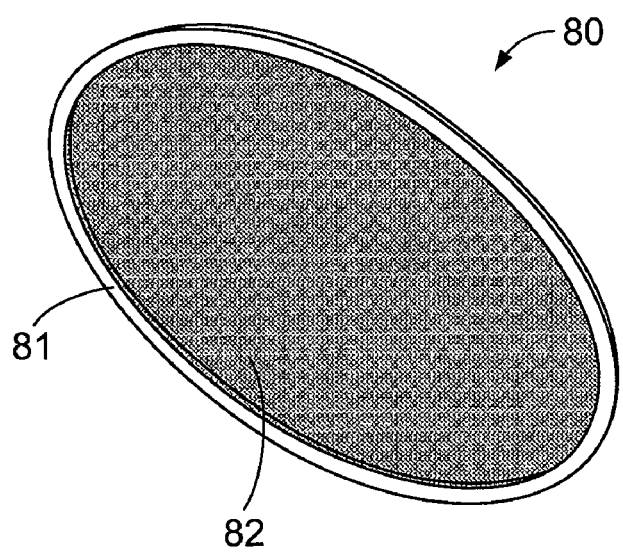

Referring to FIG. 13, the screen 80 is preferably circular and includes a perimeter support 81 and a mesh 82. The support 81 holds and adds rigidity to the mesh 82. The interstices formed in the mesh 82 permit water to flow from the lid 40 into the receptacle 12. The screen 80 catches and prevents certain debris from flowing into the receptacle 12. The mesh size or interstices determine the size of the debris held back from entering the receptacle and captured. By the above construction, the screen 80 can be easily put and held in place by the tangs 76 and removed from the tangs 76 for cleaning.

The terms "first," "second," "upper," "lower," "front," "back," etc. are used for illustrative purposes only and are not intended to limit the embodiments in any way. The term "plurality" as used herein is intended to indicate any number greater than one, either disjunctively or conjunctively as necessary, up to an infinite number. The terms "joined" and "connected" as used herein are intended to put or bring two elements together so as to form a unit, and any number of elements, devices, fasteners, etc. may be provided between the joined or connected elements unless otherwise specified by the use of the term "directly" and supported by the drawings.

While the specific embodiments have been illustrated and described, numerous modifications can be made without significantly departing from the spirit of the invention and the scope of protection is only limited by the scope of the accompanying Claims.

The invention claimed is:

1. A container for collecting liquids comprising:
a receptacle for storing the liquid having an opening at a top of the receptacle; and,
a lid covering the opening of the receptacle, the lid having a central aperture proximate a middle portion of the lid and a plurality of channels in an upper and outer surface of the lid in fluid communication with the aperture.

2. The container of claim 1 wherein the plurality of channels spoke radially outwardly from the central aperture and are pitched downwardly toward the central aperture.

3. The container of claim 1 further including a screen supported within the aperture.

4. The container of claim 1 further including at least one overflow spout in an upper portion of the receptacle.

5. The container of claim 1 further including at least one drain in a lower portion of the receptacle.

6. The container of claim 1 wherein the lid has a pitch towards the aperture.

7. The container of claim 1 wherein the receptacle has an upper perimeter lip and the lid has a perimeter lip, the two lips frictionally engaging one another.

8. The container of claim 3 wherein the screen comprises a perimeter support holding a mesh with a plurality of interstices.

9. A container for collecting liquids comprising:
a receptacle for storing the liquid with an opening at a top thereof;
a lid covering the opening of the receptacle with a central aperture therein and a plurality of radial channels in an upper and outer surface spoking out from the aperture to permit liquids impinging upon the outer surface to flow through the channels into the aperture; and,
a screen disposed within the aperture with a plurality of interstices therein.

10. The container of claim 9 wherein each channel includes a rounded end distal from the aperture.

11. The container of claim 10 wherein each channel includes a ledge proximate the aperture.

12. The container of claim 11 further comprising structure for supporting the screen in the aperture, the supporting structure including an outer ring along a periphery of the aperture and a plurality of spokes projecting outwardly from a centrally located hub.

13. The container of claim 12 wherein the outer ring is supported below the ledge by a generally cylindrical wall.

14. The container of claim 13 wherein a plurality of tangs project outwardly from an inner surface of the wall to hold the screen.

15. The container of claim 9 wherein the screen is circular and includes a perimeter support.

16. The container of claim 9 wherein the receptacle and the lid are plastic.

17. The container of claim 9 wherein the receptacle includes a first drain proximate the bottom of the receptacle.

18. The container of claim 17 wherein the first drain includes a removable cap.

19. The container of claim 9 wherein the receptacle includes a first overflow spout proximate the top of the receptacle.

20. The container of claim 19 wherein the first overflow spout includes a removable cap.

* * * * *